March 12, 1940.   P. W. DES ROCHES   2,193,123
COMPRESSOR VALVE
Filed Feb. 28, 1936
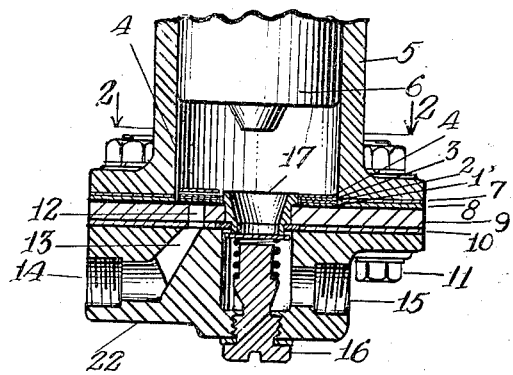
INVENTOR.
Philip W. Des Roches Patented Mar. 12, 1940

2,193,123

UNITED STATES PATENT OFFICE 2,193,123

COMPRESSOR VALVE

Philip W. Des Roches, Detroit, Mich.

Application February 28, 1936, Serial No. 66,195

14 Claims. (Cl. 230—228)

My invention has for its object to improve the performance of compressor valves, and particularly to improve their ability to seal quickly and effectively in compressors of the high rotative speed type.

A further object of my improved valve construction is to so arrange the valve of a compressor so that the clearance of the compressor may be reduced to a minimum by locating the valve parts where they may be operated upon by the piston of the compressor, and wherein the lubricant that is used to lubricate the compressor is an aid in maintaining the sealing and operation of the valves.

An object of the invention is to overcome the adverse effect of the tendency for flat sheet metal valves to warp and reduce their sealing ability thereby by the application of a holding force at edge parts of the valve at the valve seat.

The invention has for its object to provide other advantages and features that will appear upon examination of the drawing and from the description of the invention hereinafter set forth.

The invention may be applied to structures of different forms, and to illustrate a practical application of the invention, I have selected a structure as an example of the various embodiments of my invention and shall describe it hereinafter. The particular construction selected, as an example, is shown in the accompanying drawing.

Fig. 1 is a broken cross sectional view of the cylinder, and cylinder and valve heads of a compressor with the valves of my invention adapted as the inlet valve.

Fig. 2 is a top broken view of the compressor and valves looking down into the cylinder below the line 2—2 of Fig. 1.

Fig. 3 is a part section and elevation view of the cylinder and cylinder head plate taken as though the cylinder had been cut in two at the line 3—3 of Fig. 2. The inlet valves are as they would normally appear when assembled on the cylinder head plate.

Fig. 4 is a greatly enlarged diagrammatic view showing the valve parts in section and located over the port they are to seal when the piston is at a point remote from the valves.

Fig. 5 is a view the same as in Fig. 4 when the piston is as near to the cylinder head plate as its stroke permits.

Fig. 6 is a greatly enlarged view of one of the valve end parts in section, and shows the greater curvature of the part when it is unrestrained, that is, when the valve part is not pressing against or being pressed a mating valve part.

As shown in Fig. 1 the valves of my invention are located on the cylinder head plate 9 of the compressor cylinder 5, which is fitted with a piston 6, which is adapted to be reciprocated and brought to the desired clearance against the plate by adjustment of the number and thickness of the gaskets 7 and 8. Gasket 10 abuts against the other side of the plate 9 and seals thereto a second head 22, in which passages are formed to conduct the gas being compressed to and from the cylinder. Suitable means, such as through-bolts 11 secure the cylinder head and valve plate structure tightly together.

An arcuate opening, 12, is provided in the plate 9 to admit gas to the cylinder through the mating arcuate passage 13 in the second head, which communicates with the threaded inlet connection point at 14. As shown in Fig. 2 the inlet port 12 extends around the inside of the cylinder at a point near its wall and the curve of the passage 12 has for its center the center of the cylinder.

Sheet metal flapper valves 1, 2, 3, and 4 are located above this port and lie in the cylinder between the bore thereof, and the circumference of a centrally located outlet valve seat member 17. The outlet valve seat member 17 is a flanged bushing and is provided with a conical passage in its center, at the outer end of which is located a circular valve seat upon which rests a spring-pressed disc, this disc providing the outlet valve for the compressor. The disc is guided against the valve seat member by a number of ears or projections located about the circumference of the disc and past which the exhaust or discharge gas of the compressor may escape. The exhaust valve seats against the end of the member 17 at a point slightly below the lower edge of the plate 9. The block, 16, is located in the bore against which the exhaust valve disc is guided and this block forms a stop for the valve disc and a support for the helical spring which urges the disc lightly against the seat on the bottom of 17. Threaded drilled hole 15 communicates with the bore and provides a means for establishing suitable connections to conduct the discharge of the compressor to the desired point.

The flange on the upper end of the exhaust valve seat member 17 is located on the plate 9 and extends into the cylinder. Part of the flange is removed as at 18 in Fig. 2. The flange may extend into the cylinder a slightly greater distance than the combined thickness of the valves 1, 2, 3, and 4; or part combinations thereof, such as 1 and 2; or 1, 2, and 4.

A conical plug may be provided on the end of the piston which will enter the conical opening in the valve seat member 17 in order to take up some of the clearance formed by the volume of this conical opening. However the plug should fit this opening tightly. I have found that the plug may extend very near to the exhaust valve disc satisfactorily as long as there is a good clearance around the circumference of the plug and the conical hole.

It may be seen from Fig. 1 and Fig. 2 that the annular inlet valve flappers are located in the cylinder and have operative and inoperative parts that together take up nearly all the clearance thereof. They are all of the same circumferential annular outline and are formed of metal preferably, but for the purpose of this invention, the valve members may have other outline forms. The surface of the plate 9 upon which they rest is finished flat and smooth. For about three-quarters of the circumference of the cylinder in which they are nested they lie quite close to the bore of the cylinder and to the outer circumference of the flanged member 17. At point 19 they are reduced in width so as to form a greater radial clearance with respect to the flange on 17 and with respect to proximity of their outer diameter with the inner wall of the cylinder. This is to afford ample cross-sectional area for the incoming gas to enter the cylinder. To this end also part of the flange of 17 has been removed for a distance near port 12, as shown at 18 in Fig. 2.

Thus by my invention I have provided a valve structure which may be made with a very small clearance and wherein this greater lateral clearance, as at the point 18, tends to make the incoming gases enter the cylinder towards its center and thus minimizing the contact of the incoming gas with the heated cylinder wall. Also the lubricant will be distributed quickly around to all the inlet valve leaves through the small radial clearance passages above mentioned as these extend completely from and to all the end parts in the cylinder. This minimizes the tendency towards pounding when small clearances are employed which may be attributed to localization of the oil at surfaces it can not escape from easily. Having the valves located in the cylinder increases the opportunity for oil to get at and in between the valve leaves, to act as an oil cushion and also for lubrication and oil sealing.

The valves are preferably electric spot or projection welded to the valve plate 9 at the spots 20. The welds end at point 25, which makes the portion from 23 to 25 inoperable for bending as a valve and useful to take up the clearance. There are two welds at 23, which is cut out concave to form end discharge clearance for the other convex ends of the flappers. The weldable stainless steels, Monel metal, bronze, etc., are indicated as suitable materials. Where high carbon spring steel is to be used, riveting or clamping through side flanges is suggested. Riveting however necessitates a recess in the piston head. However I do not limit the application of my invention to sheet metals, as expediency may indicate the use of non-metallic materials for the spring members, or for certain spring members or their seats.

Preferably the spring valve 1, which is the principal sealing valve is made thin and with another mating leaf 2 of similar thickness. The thickness of leaves 1 and 2 is such that the coaction of both may be required to stand the pressure and establish sealing.

Due to this thinness which enables valve 1 to lie flatly readily under an applied pressure and perform its sealing and closing function it may not have strength to close rapidly and tightly of itself. An auxiliary or retaining leaf 2 is therefore located above valve 1 and is deformed by dishing upwardly in the region of the valve port so as to hold valve 1 against the edge of port 12 by the application of force around the perimeter of the port 12. This enables valve 1 to be closed quickly and tightly as desired, by the coaction of valve member 2 on valve 1. In this case a desired amount of initial tension may be stored in sheet 2 which applies to sheet 1 at its marginal port end.

Another auxiliary leaf spring 3 may be located above leaf 2 which may be of greater or differing thickness than primary pair of leaves 1 and 2. As shown in Figs. 4 and 5, clamping leaf 3 is shown thicker than leaves 1 and 2 and bears against leaf 1 through the bowed end portion of leaf 2. The elastic pressure operating in leaf 3 may be obtained by deforming it prior to assembly in the form of a descending spiral for a part its arcuate length where it will be secured to the plate 9 along towards the valve port end where it will contact leaf 2. Thus the spring 3 may be selected in manufacture, by varying its thickness and the amount of its deformation about its point of support, to present the desired closing force.

Thus by my invention there may be achieved the gas-tight sealing advantage and light weight of a thin sealing leaf 1, which is held in marginal contact about its port by elastic force developed in a second leaf 2 or by the reenforcing leaf 3 or by both 2 and 3 acting together. Or thin leaf 1 may be made satisfactorily operable by its combination with leaf 2 without the reenforcement of leaf 3 by the selection of proper thickness, material, and deformed shape of leaf 2.

The leaf 4 may be located above the leaf 3 or the leaf 2 and is preferably of heavier thickness than either of the others. It extends into the cylinder above the port 12 slightly and when the piston completes its stroke it depresses the leaf 4 against the leaf beneath it and when the piston returns the film of oil between the leaves operate to cause them to cohere slightly so that when leaf 4 rises by reason of its elasticity and its release by the movement of the piston, the leaf beneath it will be raised by the leaf 4 and will release the pressure on lower leaves and enable them to open quickly and admit gas promptly into the cylinder. Leaf 4 also acts as a stop to limit the upward travel of the lower leaves 3, 2, and 1 and may act to reenforce against the adverse effect of the operating pressure, liquid hammer, etc. Fig. 3 shows in an exaggerated way how the leaf 4 extends up into the cylinder about the valve port 12. Fig. 4 shows this diagrammatically.

Referring to Fig. 4. The leaf 4 with the piston removed takes this position. In Fig. 3 the piston has come to the end of its lower stroke and the space between the leaves is taken by an oil film and leaf 4 is now ready to spring up and take the leaf below upwardly with it.

A special feature of my invention is shown in

Fig. 6. The leaf 2 is dished upwardly along its length at the end near the port 12. This distortion is slight but is enough to insure sealing action by force application at the sides of the primary valve 1. The thinness of leaf 2 prevents fatigue failure due to this very slight dishing at this point. As shown in Figs. 4 and 5 the upward distortion is somewhat reduced from that shown in Fig. 6 owing to the pressure being applied downwardly by leaf 3.

However, it is understood that the combination of a normally flat valve member 1 and a coacting valve 2 which applies force to valve 1 at marginal portion of the valve port 12 may be employed without the clamping member 3 or the lifting member 4. In such an application of the invention, valve member 2 would be bent from its point of intended support so as to press against valve 1 at the marginal parts of the port 12 from elastic energy stored within the valve member 2. The valve member 4 which projects into the cylinder, if used, would then lie directly over the member 2 instead of over the clamping member 3. Thus a modification of the invention would obtain with such combinations as follow: valve members 1 and 2 used together as a pair; valve members 1, 2 and 3 used together but without member 4; valve members 1 and 2 used together in connection with member 4.

Further, the invention is not limited to arcuate openings nor annular sheet members. Rectangular, triangular, elliptical, segmental, sinuous, and other outline forms may be employed for the valve and port parts as expediency suggests. Also it is not required that each leaf operating in combination be identical in size and form.

Sheet materials are likely to possess internal strains which prevent these, as valve members, from being or remaining flat and it is important to have a flapper valve member lie flat on its seat in order to avoid leakage. A thick valve may lie flat but tends to be sluggish and noisy in operation. Thus by my invention I overcome the adverse effects of thinness in automatic sheet valves which makes them inherently warp and leak.

I claim:

1. In a compressor cylinder having an outlet port in a plate forming a header for the cylinder, a flange formed on the cylinder side of the plate around the outlet port, an inlet port located in the plate, the width of the flange being narrower near the inlet port and greater at a point remote from the inlet port.

2. In a compressor having a piston and a port, a valve formed of a plurality of coacting thin sheet springs, one of the springs arranged to lie flat on and cover the port and secured to a surface through which the port passes, a second thin sheet spring located and secured above the first named spring and adapted to hold the first named spring in sealing relation with and at the perimeter of the port, a third thin sheet spring superimposed and secured above the first and second named springs and deformed to press against the second named spring in the region of the port, a fourth sheet spring superimposed above and protruding in the compressor cylinder and operated by the compressor piston upon the completion of the stroke of the piston to cause the fourth named spring to adhere to the spring below it and momentarily reduce the elastic pressure on the spring below it which is closing the port, on the return stroke of the piston.

3. In a compressor having a piston and a port, a valve formed of a plurality of coacting thin sheet springs, one of the springs arranged to lie flat on and cover the port and secured to a surface through which the port passes, a second thin sheet spring located and secured above the first named spring and adapted to hold the first named spring in sealing relation with and at the perimeter of the port, a third spring protruding into the compressor cylinder and operated by the compressor piston upon the completion of the stroke of the piston to cause one of the springs closing the port to adhere and move one of the springs closing the port on the return stroke of the piston.

4. In a compressor cylinder having a piston and a valve port, a pair of sheet springs located in the compressor cylinder and having coacting operative end parts adapted to elastically cover and close the port and adapted to lie substantially flat in a recess on a plate of the valve port, said operative end parts narrowed in width adjacent to the port in order to facilitate passage of fluid through the port, and inoperative parts adapted to fill clearance space in the cylinder.

5. In combination in a valve structure having a port, a plurality of thin springs adapted to close and cover the port, the first of the springs a flat sheet adapted to lie flat over the port, a second thin sheet spring secured above the first sheet spring and deformed outwardly from the first named spring in the region of the port in order to contact the first named spring above edge parts of the port, a third thin sheet spring secured above the first two springs and adapted to press the second named spring against the first named spring at edge parts of the port.

6. In combination in a valve structure having a port, a plurality of thin sheet metal leaves supported over the port in order to elastically close the port, the first sheet metal leaf formed of flat sheet metal and adapted to lie inherently flat on a plane of the port, a second sheet metal leaf superimposed over the first named leaf and raised at its center at the port so as to contact the first named spring about the marginal parts of the first named spring to establish intimate marginal sealing relation between the first named spring and the plane of the perimeter of the port, a third sheet metal leaf superimposed over the second named leaf and adapted to press the second leaf against the first named leaf.

7. In a valve structure in a compressor having a cylinder and a piston, a cylinder closure having an inlet port therethrough, a plurality of coacting elastic sheet members located in an open slot about the port and adapted to elastically cover and close the port at edge portions of the port, the slot being widened adjacent to the port to facilitate the passage of fluid through the port and maintain a small clearance at the sheet members, in the cylinder.

8. In a compressor having a piston, an inlet port and an outlet port located in a plate forming a head of the compressor, the outlet port located centrally and having a flange extending into the cylinder and with which the flange forms an annular space, a plurality of annular sheet metal springs located in the annular space in the cylinder surrounding the outlet port and adapted to close the inlet port, part of the sheet metal springs operative to close the inlet port and part of the sheet metal springs adapted to fill the space between the flange of the outlet port and the wall of the cylinder, to reduce the clearance between the piston and the head plate of the compressor, the flange on the outlet port reduced in radius about the inlet port and the width of the springs reduced in width at the inlet port to admit fluid centrally into the compressor.

9. In a compressor cylinder having a valve port located on a plate forming a header in the cylinder, a plurality of thin sheet members secured in a recess formed on the plate and arranged to coact and elastically close and seal the port, the width of the thin sheet members adapted to correspond to the width of the recess to approximately fill the recess in the portions of the recess removed from the port, and the width of the sheet members narrowed in the region of the port to allow lateral access into the cylinder through the port when the spring members are raised from the edges of port, said changes in width of the members to secure effective valve action with a minimum of clearance on the header plate.

10. In a compressor cylinder having a valve port located on a plate forming a header in the cylinder, a plurality of thin sheet members secured in a recess formed on the plate and arranged to coact and elastically close and seal the port, the width of the thin sheet members adapted to correspond to the width of the recess in the portions of the recess removed from the port, and the width of the recess being greater in the region of the port to secure effective valve action with minimum clearance in the cylinder.

11. In a compressor cylinder having an outlet port and an inlet port adapted to admit fluid therethrough, the inlet port lying in a recess and near the cylinder wall circle, a pair of coacting leaf springs located in the recess and adapted to cover and concentrate sealing forces at the margins of the port and admit fluid laterally into the cylinder through side clearance provided in the recess around the port, the said side clearance in the recess being greater nearer the center of the cylinder than at points adjacent the cylinder wall circle to direct the incoming fluid towards the center of the cylinder and away from the cylinder wall.

12. In a valve structure having a port, a flat thin sheet spring adapted to elastically cover and close the port, a second thin sheet spring located above the first named spring and so arched transversely above the first named spring as to coact with the first named spring in sealing the port by applying sealing pressure along and directly above the first named spring at substantially all the periphery of the port and clearing the first named spring in the central portions above the port.

13. In a valve structure having an elongated port, a flat thin sheet spring adapted to elastically cover and close the port, a second thin sheet spring located above the first named spring and so arched transversely above the first named spring as to coact with the first named spring in sealing the port by applying pressure along and directly above the sides of first named spring at substantially all the periphery of the port and clearing the first named spring in the central portions above the port.

14. In a valve structure having a port, a flat thin sheet spring adapted to elastically cover and close the port, a second thin sheet spring located above the first named spring and so arched transversely above the first named spring as to coact with the first named spring in sealing the port by applying sealing pressure along and directly above the outer edges of the first named spring at substantially all the periphery of the port and clearing the first named spring in the central portions above the port and thus supplement the first named spring in resisting bending forces across the port incident to the unsupported width across the port.

PHILIP W. DES ROCHES.